United States Patent
Lee

(10) Patent No.: US 6,170,064 B1
(45) Date of Patent: Jan. 2, 2001

(54) COMPUTER AND A METHOD FOR DISPLAYING THE TIME OF USING SYSTEM

(75) Inventor: Jae-Soon Lee, Suwon (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 09/170,049

(22) Filed: Oct. 13, 1998

(30) Foreign Application Priority Data

Oct. 13, 1997 (KR) .................................................. 97-52292
Sep. 25, 1998 (KR) .................................................. 98-39925

(51) Int. Cl.$^7$ ...................................................... G06F 1/14
(52) U.S. Cl. ............................................ 713/502; 702/178
(58) Field of Search ........................... 713/502; 702/176, 702/178, 179, 186, 187

(56) References Cited

U.S. PATENT DOCUMENTS

| | | | |
|---|---|---|---|
| 4,733,361 | * 3/1988 | Krieser et al. | 702/34 |
| 4,875,167 | 10/1989 | Price et al. | |
| 5,027,294 | 6/1991 | Fakruddin et al. | |
| 5,579,252 | 11/1996 | Huang. | |
| 5,654,905 | * 8/1997 | Mulholland et al. | 702/186 |
| 5,768,602 | 6/1998 | Dhuey. | |
| 5,784,627 | 7/1998 | MacDonald. | |
| 5,923,870 | * 7/1999 | Johns et al. | 713/502 |

* cited by examiner

*Primary Examiner*—Thomas M. Heckler
(74) *Attorney, Agent, or Firm*—Robert E. Bushnell, Esq.

(57) ABSTRACT

The present invention relates to a device, a computer, and a method displaying a total quantity of time that a system has been in use and comprises a storing part having a control program and a time-storing field, a central processing unit updating data indicating the total time-in-use stored in the storing part per a predetermined time period, and outputting a control signal making the updated data become displayed, in accordance with the control program of the storing part, and a displaying part displaying a time corresponding to the time data stored in the storing part in accordance with the control signal of the central processing unit. The present invention provides effects that the total quantity of time that a system has been used can be known, and the remaining time available for the life of the system can be estimated. In other words, the total quantity of time elapsed while the computer system has been in use can be stored, updated, and displayed.

20 Claims, 9 Drawing Sheets

COMPUTER AND A METHOD FOR DISPLAYING THE TIME OF USING SYSTEM

CLAIM OF PRIORITY

This application makes reference to, incorporates the same herein, and claims all benefits accruing under 35 U.S.C. §119 from an application entitled a Computer and a Method for Displaying the Time of Using System earlier filed in the Korean Industrial Property Office Oct. 13, 1997, and there duly assigned Ser. No. 97-52292, a copy of which is annexed hereto.

BACKGROUND OF THE INVENTION

1. Technical Field

The present invention relates to a device displaying a total amount of time that the device has been in use, and more particularly a computer displaying a total amount of time that the computer has been in use and a method for displaying that total amount of time.

2. Related Art

Computer systems are information handling systems that are utilized by many individuals and businesses today. A computer system can be defined as a microcomputer that includes a central processing unit (CPU), a volatile memory, a non-volatile memory, a display monitor, a keyboard, a mouse or other input device such as a trackball, a floppy diskette drive, a compact disc-read only memory (CD-ROM) drive, a modem, a hard disk storage device, and a printer. Typically, a computer system's main board, which is a printed circuit board known as a motherboard, is used to electrically connect these components together.

The central processing unit is often described as a microprocessor. The microprocessor is an electronic component having internal logic circuitry handling most, if not all, the data processing in the computer system. The internal logic circuitry of microprocessors is typically divided into three functional parts known as the input/output (I/O) unit, the control unit, and the arithmetic-logic unit (ALU). These three functional parts interact together and determine the power and performance of the microprocessor. The combination of the control unit and the arithmetic-logic unit is sometimes referred to as the central processing unit. At other times the combination of the input/output unit, the control unit, and the arithmetic-logic unit is referred to as the central processing unit.

Computer systems include a basic input output system (BIOS) which is an especially important program stored in read only memory (ROM). The basic input output system (BIOS) tests a computer every time the computer is powered on. The basic input output system (BIOS) can allocate a computer system's resources automatically, making adjustments needed to accommodate new hardware. Also, the basic input output system (BIOS) governs how system board components interact.

A distance covered of a car is known by an odometer for testing a distance covered. Therefore, oil, tires, and other features and devices are replaced in accordance with the distance covered indicated by odometer.

In a computer, the date of making computer can be known, but the quantity of time during which a computer has been in use cannot be known. Therefore, when a durability and a mean time between failure (MTBF) of computer is tested, there is an inconvenience that a total using time can be known by checking the time from power-on to breakdown or error of computer. Furthermore, in a used computer, its time-in-use cannot be known from the above method, therefore, its available time cannot be predicted.

Exemplars of recent efforts in the art include U.S. Pat. No. 5,027,294 for Method and Apparatus for Battery-power Management Using Load-compensation Monitoring of Battery Discharge issued to Fakruddin et al., U.S. Pat. No. 4,875,167 for an Odometer Data Computing Apparatus issued to Price et al., U.S. Pat. No. 5,579,252 for a Computer Monitor Power-saving Device issued to Huang, U.S. Pat. No. 5,784,627 for an Integrated Timer for Power Management and Watchdog Functions issued to MacDonald, and U.S. Pat. No. 5,768,602 for a Sleep Mode Controller for Power Management issued to Dhuey.

While these recent efforts provide advantages, I note that they fail to adequately address how a total time-in-use of a computer system can be conveniently and efficiently stored, updated, and displayed.

SUMMARY OF THE INVENTION

It is therefore an object of the present invention to provide a computer displaying a total quantity of time corresponding to the time-in-use of the computer, thereby allowing a predicting of the remaining available time of use for the computer prior to failure of the computer.

Furthermore, it is an object of the present invention to provide a method of displaying a time-in-use of a computer.

A computer displaying a time-in-use of a computer having features of the present invention comprises a storing part, a central processing unit, and a displaying part. The storing part has a control program and a time-storing field. The central processing unit (CPU) updates time data indicating the total using time of computer stored in the storing part per a predetermined time and outputs a control signal of making the updated data displayed, in accordance with the control program of the storing part. The displaying part displays a time corresponding to the time date stored in the storing part in accordance with the control signal of the central process unit.

A method displaying a time-in-use (or a using time) of a computer having features of the present invention comprises a step of displaying a time data representing information of a total using time of computer, a step of checking time per a predetermined time, a step of updating and storing the time data, and a step of displaying the updated time data.

To achieve these and other objects in accordance with the principles of the present invention, as embodied and broadly described, the present invention provides a computer apparatus displaying a total amount of time the computer apparatus has been in use, comprising: a storage unit storing a control program and storing time data, said time data corresponding to a total quantity of time said computer apparatus has been in use; a central processing unit outputting an update signal in accordance with said control program to update said time data stored in said storage unit, and said central processing unit outputting a control signal in accordance with said control program to display said time data, said central processing unit being coupled to said storage unit; and a display unit displaying said time data in accordance with said control signal, said display unit being coupled to said central processing unit.

To achieve these and other objects in accordance with the principles of the present invention, as embodied and broadly described, the present invention provides a computer apparatus displaying a total amount of time the computer apparatus has been in use, comprising: a storage unit storing a control program and storing time data, said time data corresponding to a total quantity of time said computer apparatus has been in use; a central processing unit outputting a display signal to display said time data when a user's command signal is received, said central processing unit outputting an update signal in accordance with said control program to update said time data stored in said storage unit when said computer apparatus is powered off; and a display unit displaying said time data in accordance with said control signal, said display unit being coupled to said central processing unit.

To achieve these and other objects in accordance with the principles of the present invention, as embodied and broadly described, the present invention provides a method displaying a total amount of time a computer apparatus has been in use, comprising the steps of: displaying total time data, wherein said total time data corresponds to a total quantity of time said computer apparatus has been in use; determining new time data in accordance with a predetermined time period, wherein said computer apparatus has been in use during said predetermined time period; updating said total time data and storing updated total time data; and when said step of updating has been performed, displaying said updated total time data.

To achieve these and other objects in accordance with the principles of the present invention, as embodied and broadly described, the present invention provides a method displaying a total amount of time a computer apparatus has been in use, comprising the steps of: storing a starting time when a computer apparatus is first powered on; subtracting said starting time from a normal ending time of said computer apparatus to determine a subtracted time, said normal ending time corresponding to a time when said computer apparatus is powered off; adding said subtracted time to a total time, wherein said total time corresponds to a total quantity of time said computer apparatus has been in use; and updating said total time.

The present invention is more specifically described in the following paragraphs by reference to the drawings attached only by way of example. Other advantages and features will become apparent from the following description and from the claims.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
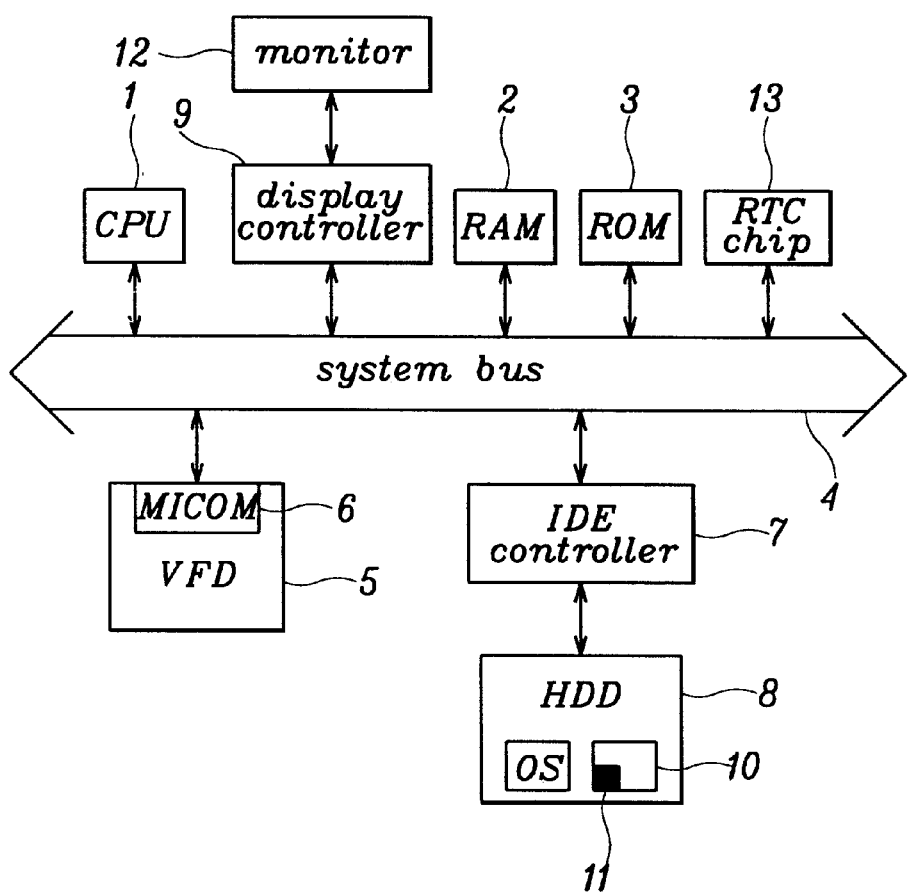
FIG. 1 is a block diagram of computer displaying a time-in-use of the computer, in accordance with a first embodiment of the present invention.
Figure 2:
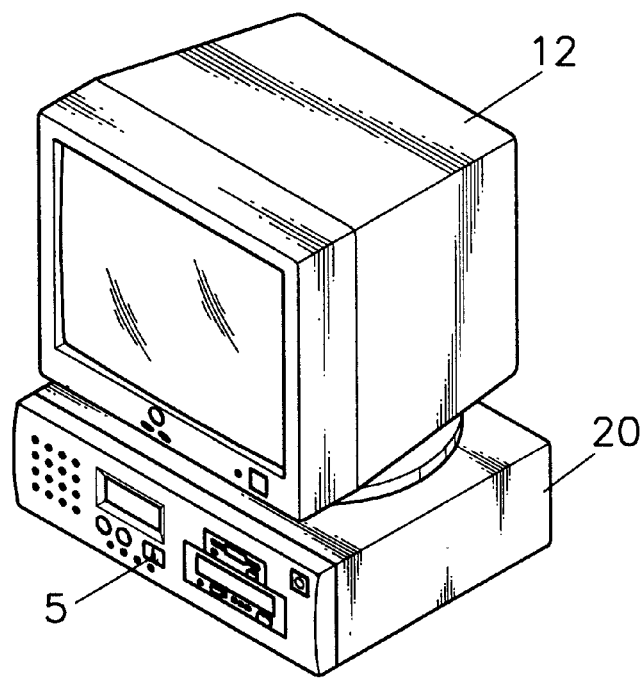
FIG. 2 is a perspective view of a computer displaying a time-in-use of the computer, in accordance with the first embodiment of the present invention.
Figure 3:
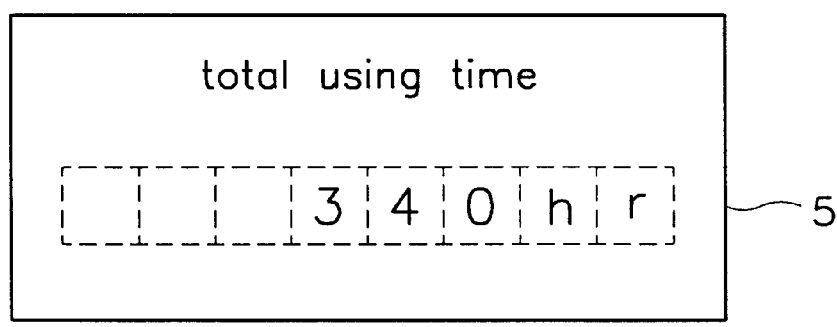
FIG. 3 is a detailed diagram of a displaying part of the computer of FIG. 2, in accordance with the first embodiment of the present invention.
Figure 4:
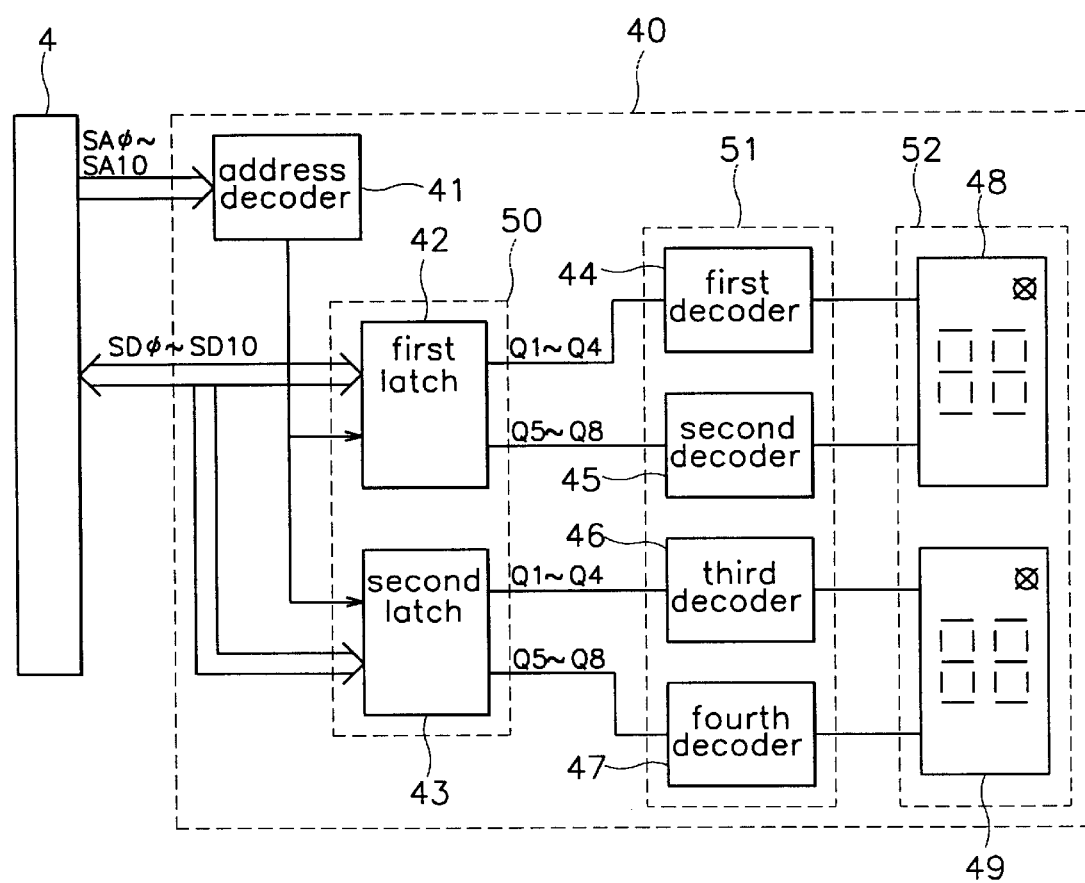
FIG. 4 is a detailed diagram of another displaying part of the computer, in accordance with the first embodiment of the present invention.
Figure 5:
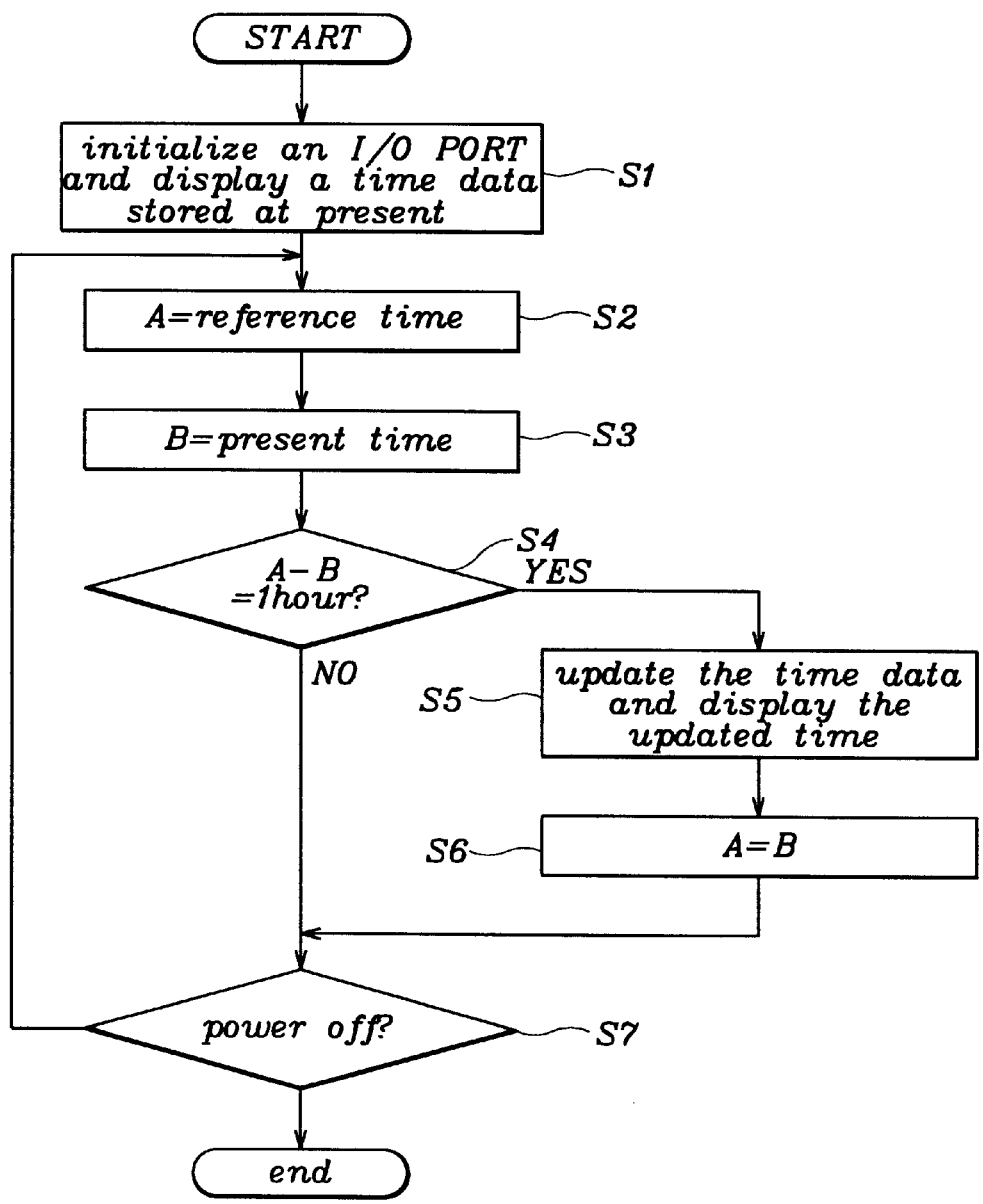
FIG. 5 is an operational flow chart of the computer displaying a time-in-use of the computer, in accordance with the first embodiment of the present invention.

A first embodiment of present invention will be described hereinafter with reference to the enclosed figures. Turn now to FIGS. 1, 2, 3, 4, and 5. FIG. 1 is a block diagram of computer displaying a time-in-use of the computer, in accordance with a first embodiment of the present invention. FIG. 2 is a perspective view of a computer displaying a time-in-use of the computer, in accordance with the first embodiment of the present invention. FIG. 3 is a detailed diagram of a displaying part of the computer of FIG. 2, in accordance with the first embodiment of the present invention. FIG. 4 is a detailed diagram of another displaying part of the computer, in accordance with the first embodiment of the present invention. FIG. 5 is an operational flow chart of the computer displaying a time-in-use of the computer, in accordance with the first embodiment of the present invention.

As shown in FIGS. 1 and 2, a computer displaying a time-in-use of the computer, in accordance with the first embodiment of the present invention comprises a random access memory (RAM) 2, a monitor 12 for displaying information, a display controller 9 for controlling the monitor 12, a hard disk drive (HDD) 8 for storing an operating system (OS) program and storing a control program 10 and having a time-storing field 11, an integrated drive electronics (IDE) controller 7 controlling the hard disk drive (HDD) 8, a central processing unit (CPU) 1 which controls the IDE controller 7 to update the time data stored in the time-storing field 11 of the hard disk drive (HDD) 8 every one hour and outputs a control signal to display the update time data when the system is used, and a visual fluorescent display 5 which has microcomputer (MICOM) 6 and receives the control signal from the central processing unit (CPU) 1 and displays the time. An integrated drive electronics (IDE) controller corresponds to an interface that links the hard disk drive (HDD) 8 to the system bus 4.

The operation of a computer which displays a time-in-use of the computer, in accordance with the first embodiment of the present invention is described in the following referring to FIGS. 1 through 5. When a power is supplied to a computer, the operation of the computer in accordance with the first embodiment of the present invention starts.

When the operation of the computer starts, the central processing unit (CPU) 1 reads a basic input output system (BIOS) in read only memory (ROM) 3, and executes a power on self test (POST), and controls an IDE controller 7 to boot the computer by an operating system program in a hard disk drive (HDD) 8. At this time, the monitor 12 displays information in accordance with the control of display controller 9. The central processing unit (CPU) 1 fetches a control program 10 in the hard disk drive (HDD) 8 to random access memory (RAM) 2 and executes the control program 10. Then, the central processing unit (CPU) 1 initializes an input and output port (I/O PORT), and controls the IDE controller 7 to transfer a time data stored in the time-storing field 11 into a visual fluorescent display (VFD) 5.

In FIG. 5 at step S1, the microcomputer (MICOM) 6 of the visual fluorescent display (VFD) 5 converts the data indicating a total time-in-use of the computer into a numeral and displays the numeral in the monitor of the visual fluorescent display 5. The FIG. 3 shows a state of displaying the time-in-use of the computer in the visual fluorescent display (VFD) 5 by a numeral. The visual fluorescent display 5, as shown in FIG. 2, is placed at the front of a system 20.

In FIG. 5 at step S2, the central processing unit (CPU) 1 inputs a reference time, that is, a time of starting to use the computer, into a certain variable A, referring to the time data in a real time clock (RTC) chip 13 shown in FIG. 1. At step S3, the central processing unit (CPU) 1 inputs the present time, that is, a converted time from the reference time, into another variable B. The variable B changes as time elapses, that is, as the program is executed repeatedly.

In FIG. 5 at step S4, the central processing unit (CPU) 1 checks whether the absolute value of the difference between A and B is one hour. That is to say, it checks to determine whether the elapsed time is over one hour since using system 20.

In FIG. 5 at step S5, when the absolute value of the difference between A and B is one hour or over one hour, the central processing unit (CPU) 1 updates the time data in the time-storing field by one hour, and displays the updated time in the visual fluorescent display (VFD) 5. At step S6, the central processing unit (CPU) 1 changes the variable B, that is the present time, into variable A.

In FIG. 5 at step S7, the central processing unit (CPU) 1 checks if a command of power off occurs. At step S7, when the absolute value of the difference between A and B is not more than one hour, as determined in step S4, then central processing unit (CPU) 1 checks if the command of power off occurs. When the command of power off occurs, the program is ended and power is turned off. Otherwise, the time checking is continued repeatedly. In the above process, the visual fluorescent display 5 can describe 999999 hours at maximum, and this is enough to display the time-in-use of the computer, and this time is changeable as occasion demands.

The FIG. 4 shows a display device using 7-segment LED 40 instead of the visual fluorescent display device 5 in FIG. 1. As shown in FIG. 4, the display device using 7-segment LED 40 comprises an address decoder 41 for decoding a specified address of the addresses outputted from the central processing unit (CPU) 1 through a system bus 4. A latching part 50, which is comprised of a first latch 42 and a second latch 43, latches a data corresponding to the specified address if a clock signal decoded from the address decoder is inputted, a data decoding part 51 which is comprised of a first to a fourth decoder 44–47 converts the binary data outputted from the latching part 50 into hexadecimal, a 7-segment display device which is comprised of a first segment 48 and receives the outputted signal From the data decoding part 51 and displays it. The central processing unit (CPU) 1 controls to output the specified address corresponding to the time data and the data corresponding to the specified address.

With reference to FIG. 4, the operation of the display device using 7-segment LED 40 can be described as follows. When the specified address is inputted from the central processing unit (CPU) 1 to the address decoder 41 through address buses SA0–SA10, the address decoder 41 outputs the clock signal to the latching part 50. The first latch 42 and the second latch 43 latch the data corresponding to the specified addresses SA0–SA10 through the data buses SD0–SD10.

The first decoder 44, the second decoder 45, the third decoder 46, the fourth decoder 47 of 6 the date decoding part 51 convert and output their corresponding binary date Q1–Q8 to hexadecimal data. The first segment 48 and the second segment 49 at the 7-segment display device 52 displays the data by numeral. Another display device like a liquid crystal or a light emission display may be used for displaying.

A second embodiment of present invention will be described hereinafter with reference to enclosed FIG. 6. Please turn now to FIG. 6, which is a block diagram of a computer displaying a time-in-use of the computer, in accordance with a second embodiment of present invention.

Figure 6:
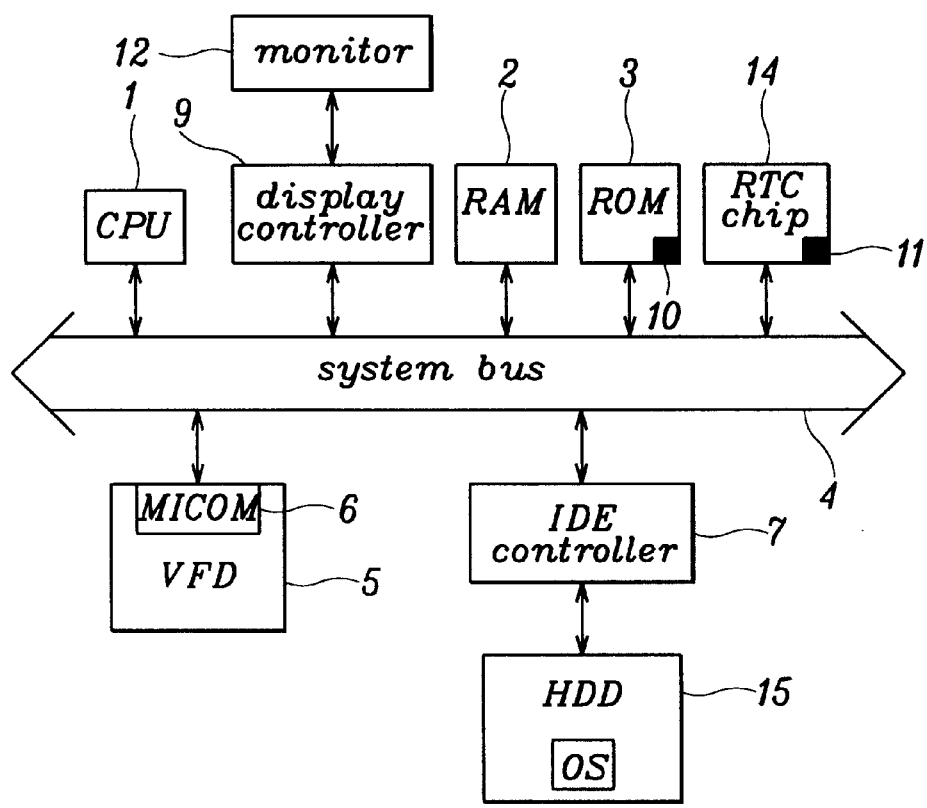
FIG. 6 is a block diagram of a computer displaying a time-in-use of the computer, in accordance with a second embodiment of present invention.

As shown in FIG. 6, a computer displaying a time-in-use of the computer, in accordance with the second embodiment of the present invention, comprises a read only memory (ROM) 3 which has a basic input output system (BIOS) and a control program 10, a real time clock (RTC) chip 13 which has a time-storing field 11, a random access memory (RAM) 2, a monitor 12 for displaying information, a display controller 9 which controls the monitor 12, a hard disk drive (HDD) 15 having an operating system (OS) program, an IDE controller 7 which controls the hard disk drive (HDD) 15, a central processing unit (CPU) 1 which updates the time stared in the time-storing field of the real time clock (RTC) chip 13 every one hour and controls to display the time when the system 20 is used, a visual fluorescent display (VFD) 5 which has a microcomputer (MICOM) 6 and receives the control signal from the central processing unit (CPU) 1 and displays the time in the computer displaying a time-in-use of the computer in accordance with the second embodiment of the present invention.

In FIG. 6, which shows the second embodiment of the present invention, the control program 10 is stored in the read only memory (ROM) 3 and the time-storing field 11 is stored in the real time clock (RTC) chip 14. Thus, the second embodiment, shown in FIG. 6, varies from the first embodiment, shown in FIG. 1, because the control program 10 of the first embodiment and the time-storing field 11 of the first embodiment were stored in the hard disk drive (HDD) 8.

As shown in FIG. 6, in the operation of the second embodiment of the present invention, the central processing unit (CPU) 1 reads the control program 10 from the read only memory (ROM) 3 and stores the time data in the time-storing field 11 of the real time clock (RTC) chip 14. Other operations of the second embodiment of the present invention are the same as that of the first embodiment of the present invention.

Figure 7:
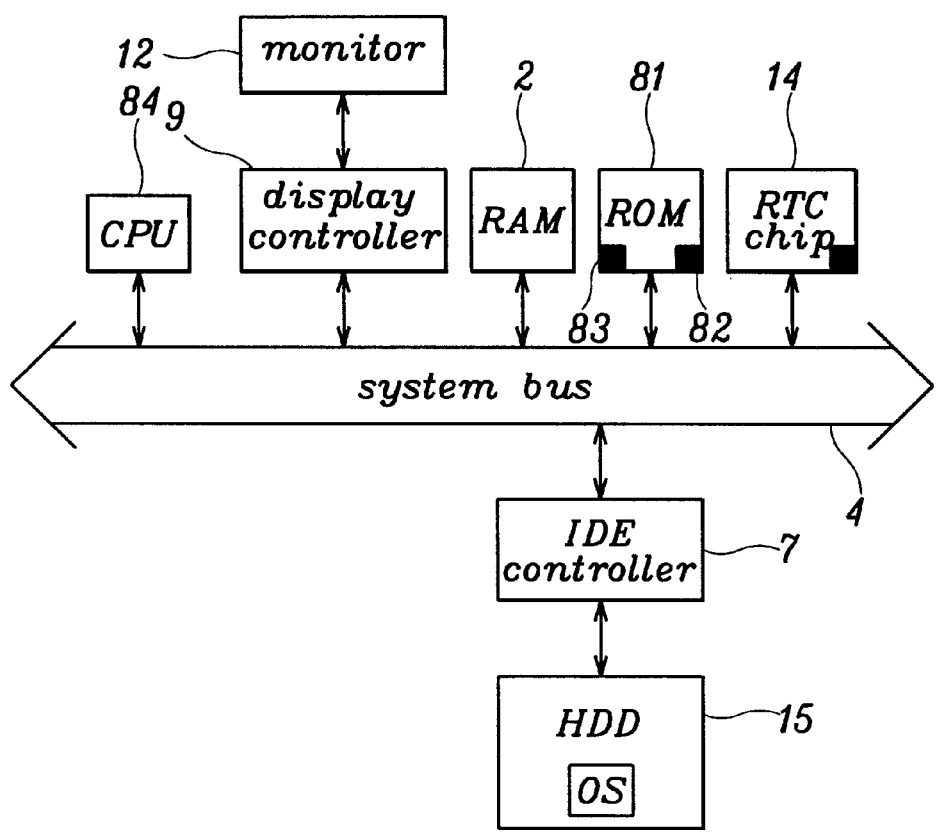
FIG. 7 is a block diagram of a computer displaying a time-in-use of the computer, in accordance with a third embodiment of the present invention.
Figure 8:
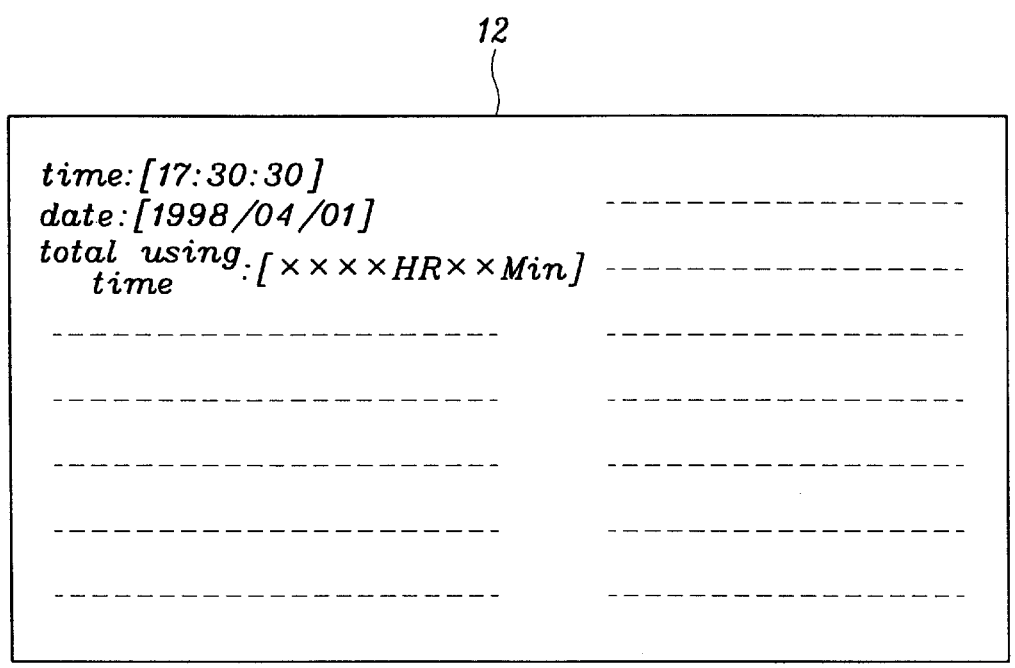
FIG 8 illustrates an example of a display displaying the time-in-use of the computer of FIG. 7, in accordance with the third embodiment of the present invention.
Figure 9:
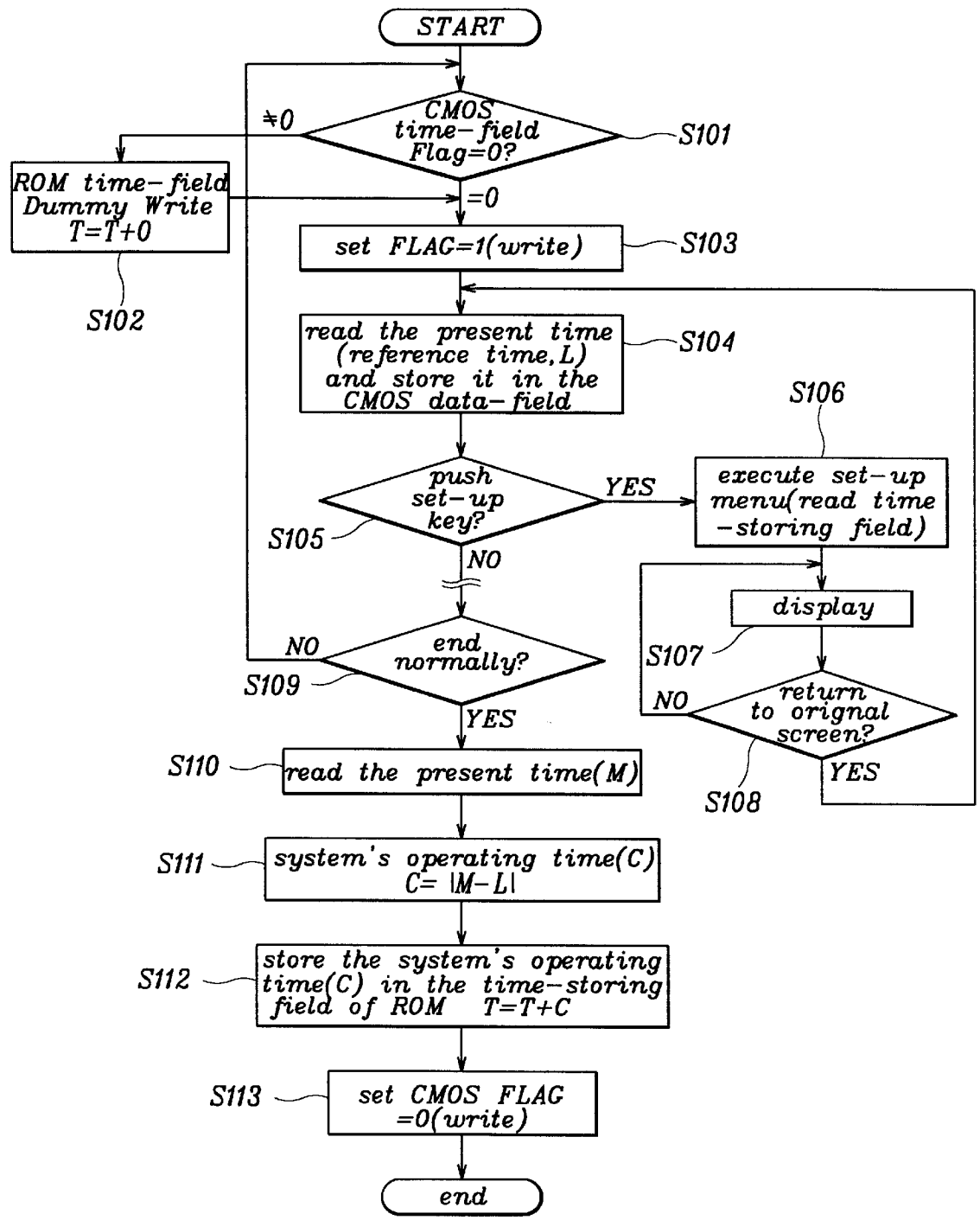
FIG. 9 is an operational flow chart of the computer displaying a time-in-use of the computer, in accordance with the third embodiment of the present invention.

A third embodiment of the present invention will be described hereinafter with reference to enclosed FIGS. 7, 8, and 9. Turn now to FIGS. 7, 8, and 9. FIG. 7 is a block diagram of a computer displaying a time-in-use of the computer, in accordance with a third embodiment of the present invention. FIG. 8 illustrates an example of a display displaying the time-in-use of the computer of FIG. 7, in accordance with the third embodiment of the present invention. FIG. 9 is an operational flow chart of the computer displaying a time-in-use of the computer, in accordance with the third embodiment of the present invention.

As shown in FIG. 7, a computer displaying time-in-use of the computer in accordance with the third embodiment of the present invention comprises a read only memory (ROM) 81 which has a basic input output system (BIOS), a time-storing field 82, a control program 83, an real time clock (RTC) chip 14 which has information about time, a random access memory (RAM) 2, a monitor 12 for displaying information, a display controller 9 to control the monitor 12, a hard disk drive (HDD) 15 which has an operating system (OS) program, an IDE controller 7 to control the hard disk drive (HDD) 15, a central processing unit (CPU) 84 which updates a time stored in the time-storing field 82 of the read only memory (ROM) 81 when the system ends normally and controls to display the time.

The operation of the third embodiment of the present invention is described as follows with reference to FIG. 9. When power is turned on by a user, the computer displaying its using time in accordance with the third embodiment of the present invention starts to operate, when the operation is started, the central processing unit (CPU) 84 reads the basic input output system (BIOS) of the read only memory (ROM) 81 and executes the power on self test (POST) and then controls the IDE controller 7 to boot the computer by the operating system program of the hard disk drive (HDD) 15. At this time, the monitor 12 displays information according to the control of the display controller 9.

The central processing unit (CPU) 84 fetches the control program 83 in the read only memory (ROM) 81 into random access memory (RAM) 2 and executes the control program 83. In FIG. 9 at step S101, the central processing unit (CPU) 84 initializes an input/output (I/O) port and checks to determine whether a CMOS time-field flag of the real time clock (RTC) chip 14 is equal to zero. The term CMOS refers to a complementary metal oxide semiconductor.

At step S102, if the complementary metal oxide semiconductor (CMOS) time-field flag of the real time clock (RTC) chip 14 is not equal to zero, the time T of the time-storing field 82 in the read only memory (ROM) 81 is left as it is. At step S103, the complementary metal oxide semiconductor (CMOS) time-field flag of the real time clock (RTC) 14 is set to be equal to 1. At step S104, the central processing unit (CPU) 84 reads the present time L and stores it in the complementary metal oxide semiconductor (CMOS) data-field.

At step S105, the central processing unit (CPU) 84 determines whether a set-up key is pushed by a user. At step S106, when the set-up key is pushed by the user, the central processing unit (CPU) 84 executes a set-up menu. At step S107, the central processing unit (CPU) 84 controls display controller 9 to display a screen 12 as shown in FIG. 8. The screen 12 of FIG. 8 includes information such as current time, current date, and also the total quantity of time during which the computer system has been in use, shown in hours and minutes. As shown in FIG. 8, information about the total time-in-use of the computer is inserted to be easily seen in the setup information of the computer.

In FIG. 9, at step S108, a determination is made as to whether a command of EXIT occurs instructing that the original screen should be displayed. If the command of EXIT does occur at step S108, then the central processing unit (CPU) 84 makes the original screen return.

The central processing unit (CPU) 84 executes a certain work by a user's key input. At step S109, a determination is made as to whether a system shut-down command is entered. At step S110, when a system shut-down command is determined to be entered in step S109, then the central processing unit (CPU) 84 reads the present time M. At step S11, the central processing unit (CPU) 84 calculates the system's total operating time C. The system's total operating time C is the total time-in-use of the system. The system's total operating time C is the result of a subtraction of the system's starting time L from the present time M.

At step S112, the central processing unit (CPU) 84 adds the system's operating time C to the total time-in-use T of system stored in the time-storing field of the read only memory (ROM) 81. At step S113, the central processing unit (CPU) 84 sets the complementary metal oxide semiconductor (CMOS) time-field flag to be equal to zero. Then all processes are ended.

In the aforementioned third embodiment of the present invention, as shown in FIGS. 7 through 9, there is an advantage that the working speed of system does not diminish, because the total time-in-use of the computer is updated when system is shut down. By displaying the total time-in-use of the computer in the setup information, a user can know the time-in-use of the computer conveniently without another display device.

Figure 10:
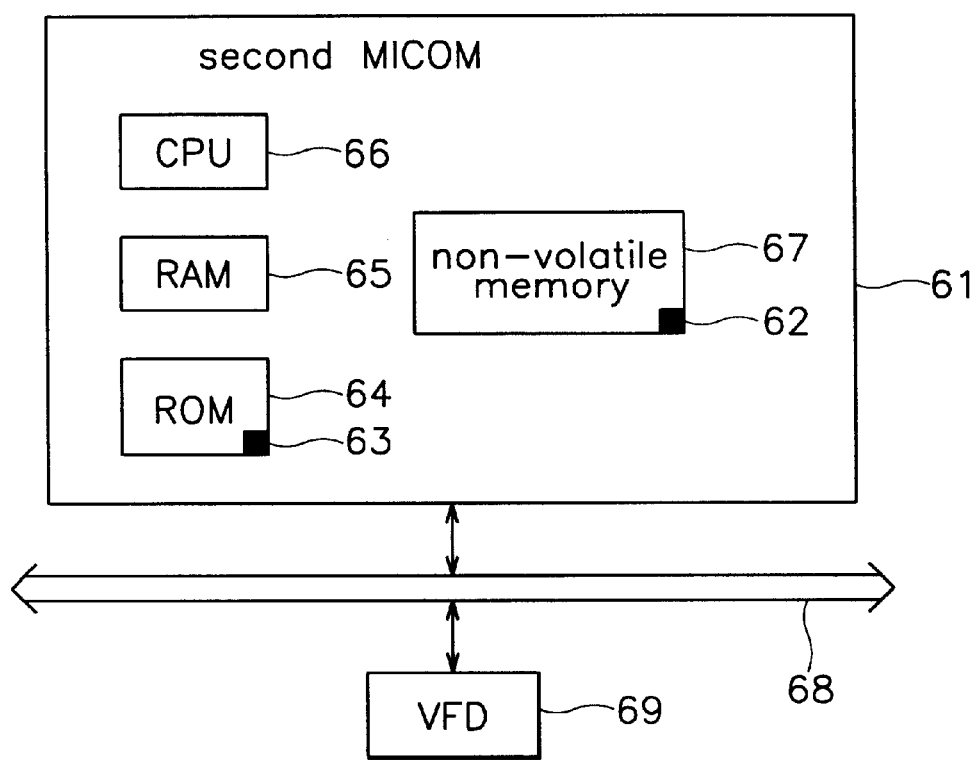
FIG. 10 is a block diagram of a device displaying a time-in-use of the device, in accordance with a fourth embodiment of present invention.

Turn now to FIG. 10, which is a block diagram of a device displaying a time-in-use of the device, in accordance with a fourth embodiment of present invention. The fourth embodiment of the present invention will described as follows with reference to FIG. 10.

As shown in FIG. 10, a device displaying the time-in-use of the device, in accordance with the fourth embodiment of the present invention, comprises a second microcomputer (MICOM) 61. The microcomputer (MICOM) 61 has a control program 63 in read only memory (ROM) 64, a central processing unit 66, a time-storing field 62 in a non-volatile memory 67, a random access memory (RAM) 65. The microcomputer (MICOM) 61 updates the time-in-use of the system stored in the time-storing field 62 every one hour when the system is in a power-on state and controls a display of the time-in-use of the system. Also, the fourth embodiment of the present invention, as shown in FIG. 10, includes a visual fluorescent display (VFD) 69 which receives the control signal from the second microcomputer (MICOM) 61 and displays the time-in-use of the system. The visual fluorescent display (VFD) 69 is coupled to the microcomputer (MICOM) 61 with a unit 68.

The device of FIG. 10 displaying the time-in-use of the device, in accordance with the fourth embodiment of the present invention, is similar to the second embodiment of the present invention in elements, but the position of the elements has been varied. The second embodiment of the present invention is shown in FIG. 6. The fourth embodiment updates the time data stored in the time 5 storing field as time elapses and displays the updated data on the visual fluorescent display (VFD) 69 by a simple configuration. Therefore, the present invention can be applied to many electronic devices like a television, a radio, a toaster, audio equipment, a dishwasher, a washing machine, a dryer, a microwave oven, a refrigerator, a printer, a cellular telephone set, a standard telephone set, a video cassette recorder, a scanner, a camcorder, and many other electronic devices.

The present invention allows a user to be aware of the total the time-in-use of a system, and the user can therefore predict the remaining available usable time of system. In other words, when a user knows the total quantity of time during which a device has been used, that user is better able to predict when the device will fail. Thus, the remaining available time during which the device can be used can be determined or estimated. This information can be extremely useful. The time-in-use of the device can be useful in knowing when maintenance should be performed on particular components.

In the foregoing paragraphs, the present invention relates to a device displaying its using time and a method thereof, in particular, a displaying method and a device for displaying its total using time after power is on, in electronic devices.

In the drawings and specification, there are disclosed typical preferred embodiments of the present invention and, although specific terms are employed, they are used in a generic and descriptive sense only and not for purposes of limitation, the scope of the invention being set forth in the following claims.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus displaying a total amount of time a device has been powered on, said apparatus comprising:
    a storage unit storing a control program and storing time data, said time data corresponding to a total quantity of time said device has been in a powered on state;
    a central processing unit outputting an update signal in accordance with said control program to update said time data stored in said storage unit, and said central processing unit outputting a control signal in accordance with said control program to display said time data, said central processing unit being coupled to said storage unit;
    a display unit displaying said time data in accordance with said control signal, said display unit being coupled to said central processing unit; and
    said time data stored in said storage unit being updated only when said device is changing from the powered on state to a powered off state.

2. The apparatus of claim 1, wherein said device is selected from the group consisting of a television, a radio, a printer, a scanner, a computer, a display unit, a washing machine, a clothes dryer, a microwave oven, a convection oven, a toaster, a refrigerator, a dishwasher, a telephone, a video recorder unit, and an audio unit.

3. The apparatus of claim 1, wherein said storage unit corresponds to a disk storing said control program and said time data.

4. The apparatus of claim 1, said storage unit further comprising:
    a read only memory storing said control program; and
    a real time clock chip storing said time data.

5. The apparatus of claim 1, said display unit displaying said time data only when said device is changing from the powered off state to the powered on state.

6. The apparatus of claim 1, said updating of said time data being performed to record a quantity of predetermined time periods which elapsed while said device was in the powered on state.

7. The apparatus of claim 6, each one of said predetermined time periods corresponding to one hour.

8. The apparatus of claim 1, further comprising a system bus disposed between said central processing unit, said storage unit, and said display unit, wherein said central processing unit outputs an address corresponding to said time data through said system bus.

9. The apparatus of claim 8, wherein said central processing unit outputs information corresponding to said address through said system bus.

10. The apparatus of claim 9, wherein said display unit further comprises:
    an address decoder decoding said address outputted from said central processing unit through said system bus;
    a latching unit latching said information corresponding to said address outputted from said central processing unit through said system bus when said address inputs to said address decoder;
    a data decoder receiving binary data outputted from said latching unit, converting said binary data into hexadecimal data, and outputting said hexadecimal data; and
    a displaying system receiving said hexadecimal data from said data decoder and to displaying said hexadecimal data.

11. The apparatus of claim 10, said display unit displaying said time data in response to a user's request to display said time data.

12. The apparatus of claim 11, when said display unit is displaying said time data, said display unit ending said displaying of said time data in response to a user's request to end said displaying of said time data.

13. The apparatus of claim 12, said user's request to display said time data corresponding to said user pressing a first key, said user's request to end said displaying of said time data corresponding to said user pressing a second key.

14. An apparatus displaying a total amount of time a device has been powered on, comprising:
    a storage unit storing a control program and storing time data, said time data corresponding to a total quantity of time said device has been in use;
    a central processing unit outputting a display signal to display said time data when a user's command signal is received, said central processing unit outputting an update signal in accordance with said control program to update said time data stored in said storage unit when said device is powered off; and
    a display unit displaying said time data in accordance with said control signal, said display unit being coupled to said central processing unit.

15. The apparatus of claim 14, wherein said storage unit corresponds to a read only memory.

16. The apparatus of claim 14, wherein said display unit is selected from among a cathode ray tube, a liquid crystal display, a gas-plasma display, a light emitting diode display, an electro-luminescent display, and a field emission display.

17. A method displaying a total amount of time a device has been in use, comprising the steps of:

displaying total time data, wherein said total time data corresponds to a total quantity of time said device has been in use;

determining new time data in accordance with a predetermined time period, wherein said device has been in use during said predetermined time period;

updating said total time data and storing updated total time data; and when said step of updating has been performed, displaying said updated total time data.

18. The method of claim 17, wherein said step of updating said total time data further comprises:

updating said total time data every one hour while said device is in a power-on state; and discontinuing said updating of said total time data when said device is in a power-off state.

19. A method displaying a total amount of time a device has been in use, comprising the steps of:

storing a starting time when a device is first powered on;

subtracting said starting time from a normal ending time of said device to determine a subtracted time, said normal ending time corresponding to a time when said device is powered off;

adding said subtracted time to a total time, wherein said total time corresponds to a total quantity of time said device has been in use; and updating said total time.

20. The method of claim 19, further comprising:

including said total time in a setup information program of said device; and displaying setup data corresponding to said setup information program.

* * * * *